United States Patent [19]

Denhez et al.

[11] Patent Number: 4,698,826

[45] Date of Patent: Oct. 6, 1987

[54] CLOCK REPEATER FOR TRIPLICATED CLOCK DISTRIBUTOR

[75] Inventors: Alain Denhez, Velizy-Villacoublay; Francis Hargoaa, Paris; Jean Aubrée, Bougival, all of France

[73] Assignee: Alcatel, Paris, France

[21] Appl. No.: 826,696

[22] Filed: Feb. 6, 1986

[30] Foreign Application Priority Data

Feb. 7, 1985 [FR] France ................................. 85 01722

[51] Int. Cl.⁴ .............................................. H04L 7/06
[52] U.S. Cl. ...................................... 375/3; 375/113; 307/517
[58] Field of Search ....................... 375/3, 4, 113, 114; 328/63, 72; 371/42; 307/517

[56] References Cited

U.S. PATENT DOCUMENTS

| | | | |
|---|---|---|---|
| 3,601,537 | 8/1971 | Gueldenpfenning | 375/113 |
| 4,017,684 | 4/1977 | Kurihara et al. | 375/114 |
| 4,227,251 | 10/1980 | Kazama et al. | 375/4 |
| 4,276,645 | 1/1981 | Lager et al. | 371/36 |
| 4,327,356 | 4/1982 | Gilliland | 375/4 |
| 4,355,400 | 10/1982 | Doemer et al. | 375/4 |
| 4,562,581 | 12/1985 | Tanaka et al. | 375/113 |

FOREIGN PATENT DOCUMENTS 1527160 10/1978 United Kingdom .

Primary Examiner—Robert L. Griffin
Assistant Examiner—Stephen Chin
Attorney, Agent, or Firm—Sughrue, Mion, Zinn, Macpeak and Seas

[57] ABSTRACT

In a triplicated clock distribution system each clock delivers a clock and synchronization signal that comprises a clock signal and a synchronization signal, the latter consisting of a negative and a positive pulse each having a duration equal to the period of the clock signal. Each clock is connected to a receiver by at least one repeater. A repeater comprises an inverter, an inverter circuit, a test circuit, a restore and shift circuit and a regenerator circuit. The test circuit tests the duration of the pulses in order to detect the synchronization signal and delivers a pulse in response to such detection of the synchronization signal. The restore circuit delivers a pulse the duration of which is equal to one pulse of the synchronization signal, shifted by two periods of the clock signal. The inverter circuit inverts the edge between the two pulses of the synchronization signal and the clock generator circuit delivers a clock and synchronization signal to the output of the repeater.

5 Claims, 4 Drawing Figures

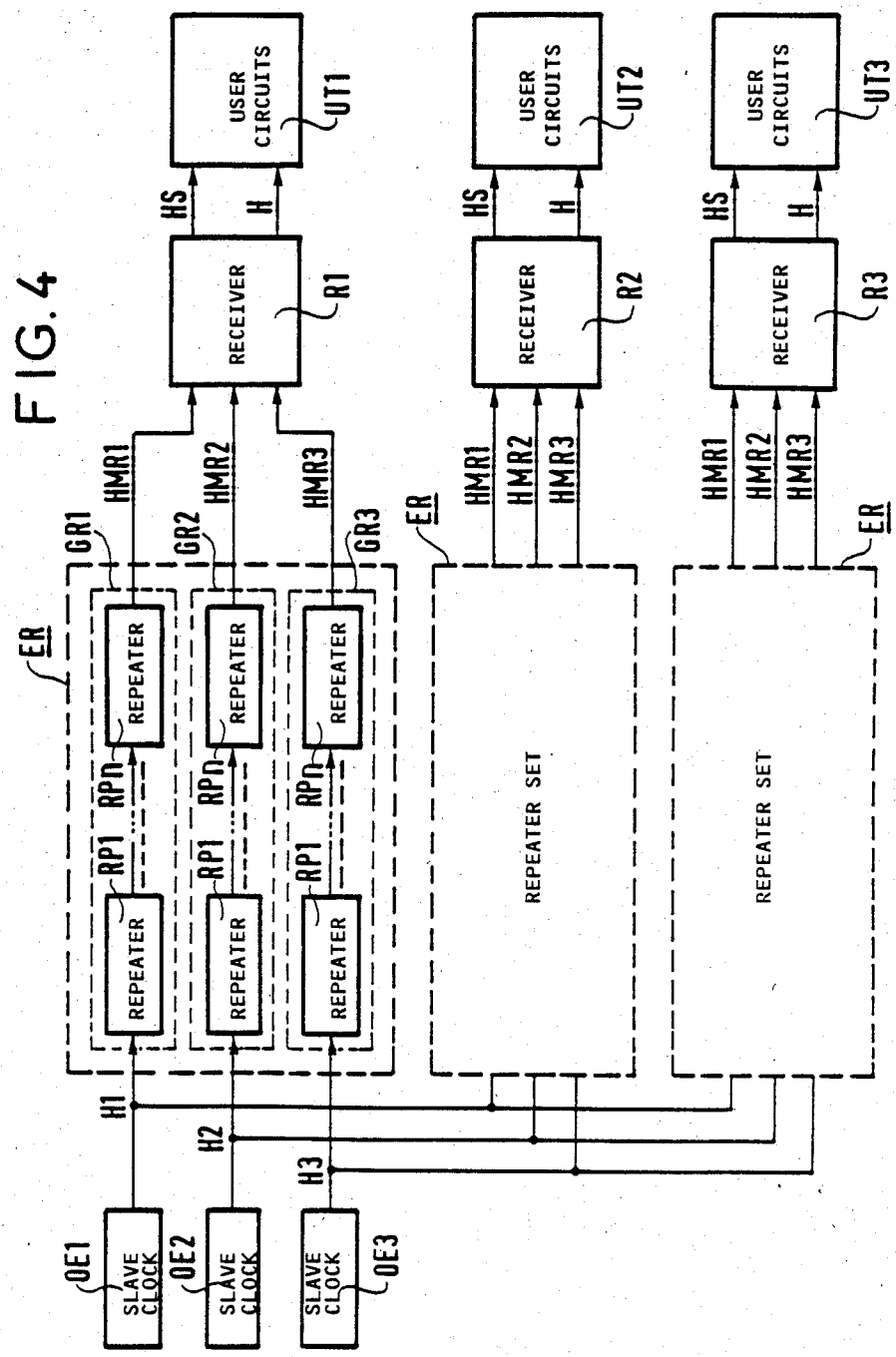

CLOCK REPEATER FOR TRIPLICATED CLOCK DISTRIBUTOR

BACKGROUND OF THE INVENTION

1. Field of the Invention

The invention concerns the distribution of a triplicated clock to one or more receivers.

2. Description of the Prior Art

It is well known, when the receivers are far away from the triplicated clock, to insert into each connection between a clock of the triplicated clock and a receiver one or more repeaters according to the distance to the receivers. The invention is more particularly concerned with the case where each clock signal comprises a synchronization signal consisting of two pulses, a negative pulse and a positive pulse, each having a duration equal to one period of the clock signal, the change from one pulse to the other constituting a synchronization mark.

With a clock signal comprising a synchronisation signal like this, the use of n conventional repeaters in cascade would result in multiplying by n the propagation time dispersion values for the signal edges relating to the synchronization mark, resulting in an error in respect of the cyclic ratio of the clock signal regenerated in place of the synchronization signal delivered by each repeater, depending on the number of repeaters in a clock/receiver connection.

An objective of the present invention is to eliminate the accumulation of the propagation times of the clock edges relating to the synchronization marks in each connection between a clock of the triplicated clock and a receiver in order to limit the error in respect of the cyclic ration of the clock signal delivered by the receiver.

SUMMARY OF THE INVENTION

The present invention consists in a repeater for connecting to a receiver a clock producing a clock and synchronization signal consisting of a clock signal and a synchronization signal that comprises one positive pulse and one negative pulse, each pulse having a duration equal to one period of said clock signal, said repeater comprising an inverter adapted to invert an incoming clock and synchronization signal, an inverter circuit, a test circuit, a restore and shift circuit and a clock generator circuit, in which repeater said test circuit has an input connected to said inverter and an output connected to said test circuit and said restore and shift circuit, said test circuit is adapted to test the duration of signal pulses from said inverter in order to detect said synchronization signal and to generate a pulse in response to such detection of said synchronization signal, said restore and shift circuit has a first input connected to said test circuit, second and third inputs connected to an output of said inverter circuit and an output connected to said clock generator circuit, said restore and shift circuit is adapted to generate a pulse the duration of which is equal to that of one pulse of said synchronization signal and which is shifted by two periods of said clock signal relative to said negative pulse of said synchronization signal, and said clock generator circuit has its input connected to the output of said restore and shift circuit and to said inverter circuit and is adapted to produce at its output a clock and synchronization signal.

The characteristics and advantages of the invention will emerge more clearly from the following description of embodiments of the invention given with reference to the accompanying drawings.

BRIEF DESCRIPTION OF THE DRAWINGS

FIG. 4 shows triplicated distribution to a plurality of receivers using repeaters in accordance with the invention.

DESCRIPTION OF THE PREFERRED EMBODIMENTS

Figure 1:
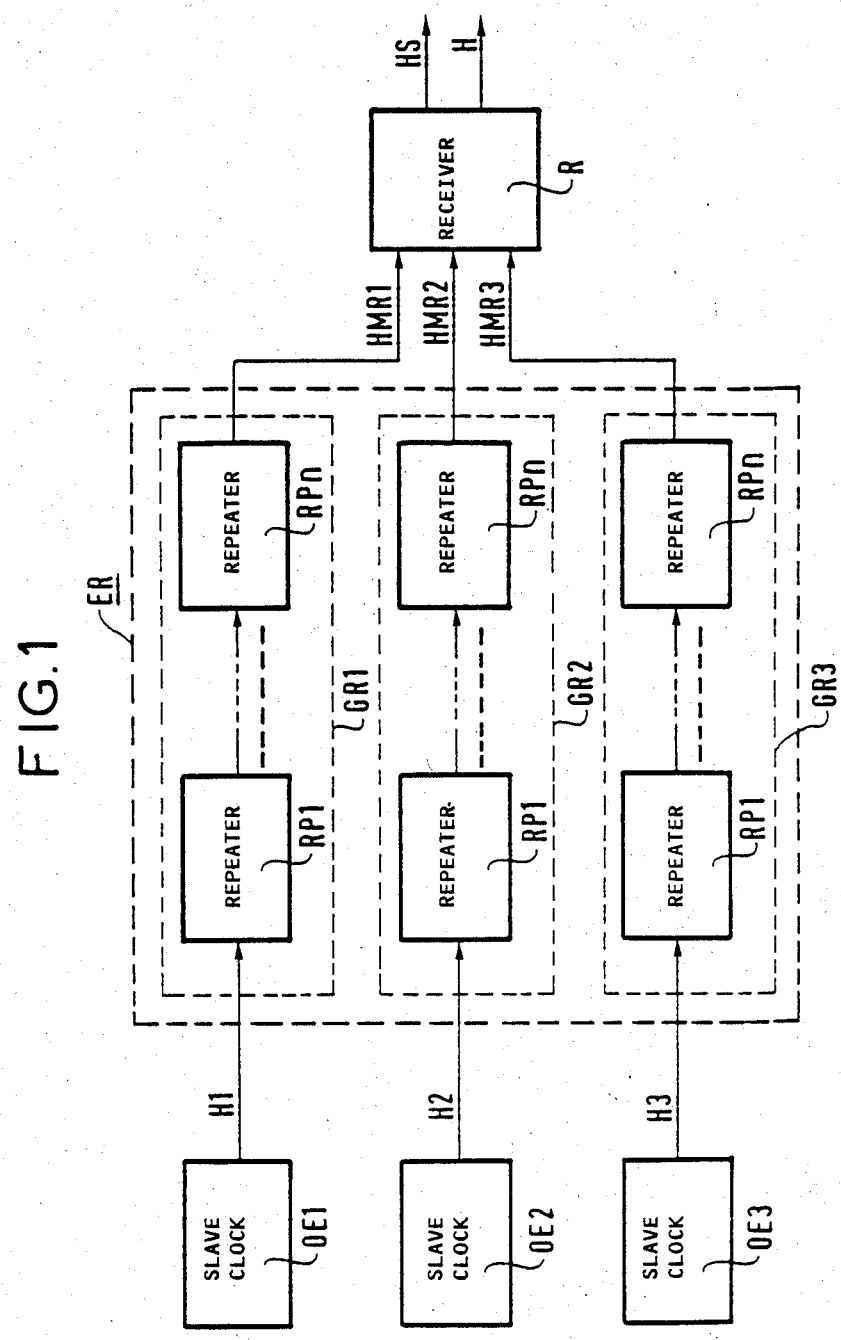
FIG. 1 shows the distribution of a triplicated clock to a receiver using repeaters in accordance with the invention.
Figure 3:
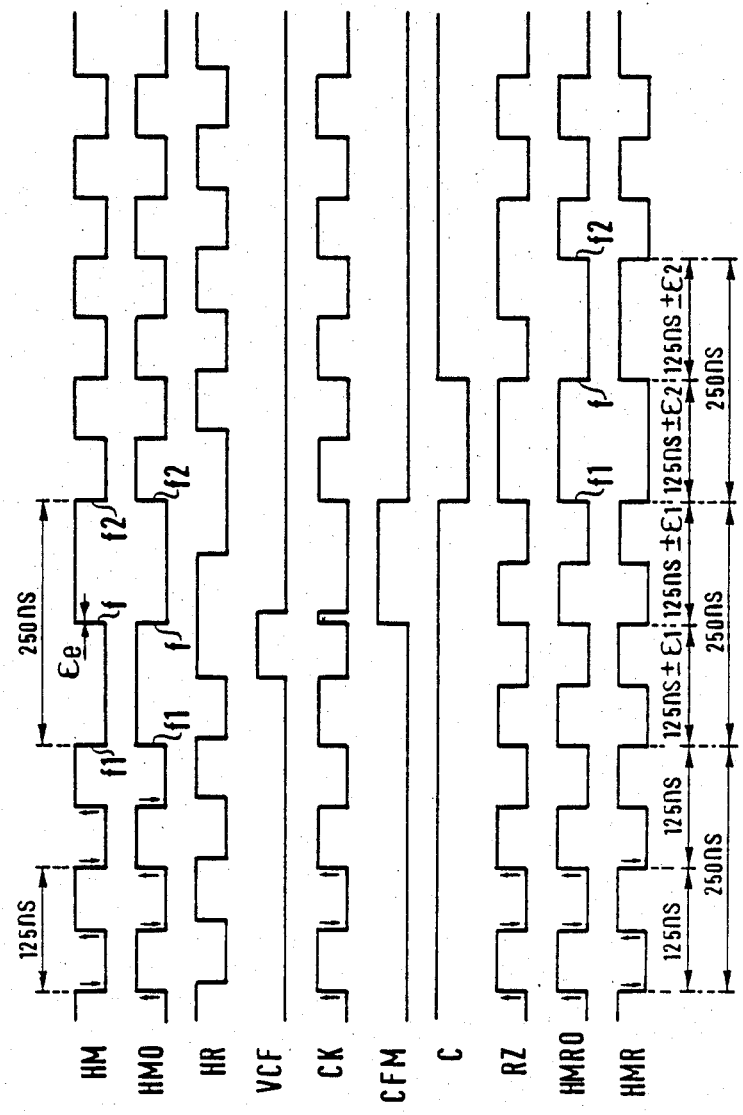
FIG. 3 is a timing diagram for the signals of the FIG. 2 repeater.

FIG. 1 shows the distribution of a triplicated clock to a receiver using repeaters in accordance with the invention. In this figure OE1, OE2 and OE3 are slave clocks driven in known manner by at least one mother clock (not shown), ER is a set of repeaters comprising three groups of repeaters GR1, GR2 and GR3 each of which consists of n repeaters in series, where the value of n is at least 1, and R is a receiver. Each slave clock is connected to the receiver by a group of repeaters and delivers a respective clock and synchronization signal H1, H2, H3. As shown in FIG. 3 by the signal HM, each clock and synchronization signal comprises a clock signal and a synchronization signal; the synchronization signal itself comprises a negative pulse and a positive pulse of the same duration, the duration of each pulse being equal to one period of the clock signal. The change from the negative pulse to the positive pulse of the synchronization signal is effected by a positive edge f but if there were a clock signal instead of the synchronization signal the edge f would be a negative edge of the clock signal.

Consequently the positive edge f corresponds to an inversion of the negative edge of the clock signal; this edge f defines the synchronization mark. In the timing diagram of FIG. 3 the signal HM relates to the clock and synchronization signal at the input of any clock repeater from a group of repeaters; in the case of clock repeater RP1 the signal HM corresponds to the clock and synchronization signal from a slave clock H1, H2 or H3.

The receiver R receives from the last repeater RPn of each group of repeaters GR1, GR2, GR3 a respective clock and synchronization signal HMR1, HMR2, HMR3 and delivers a synchronization signal HS and a clock signal H to user circuits on its output side (not shown).

Figure 2:
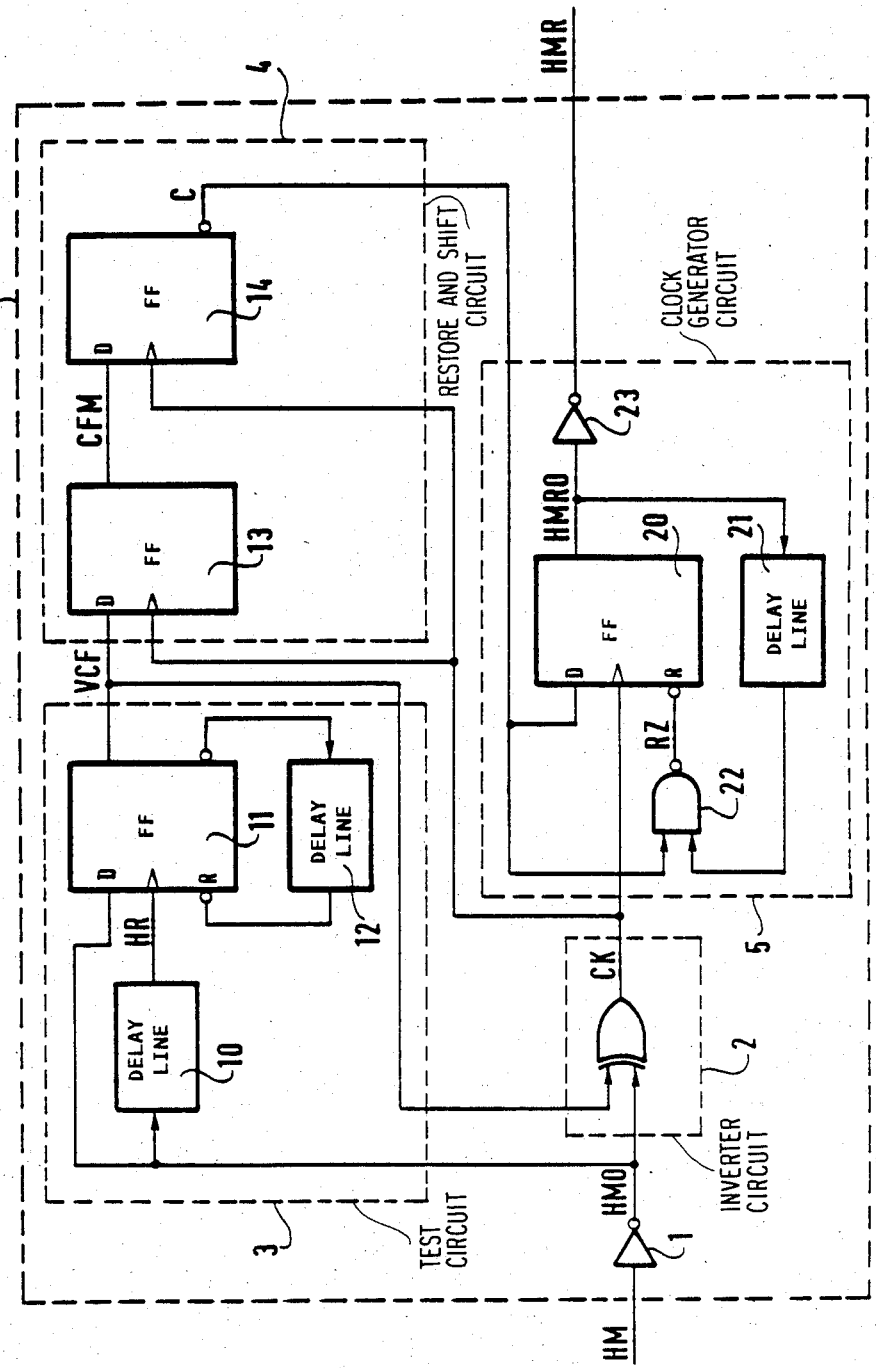
FIG. 2 shows a repeater in accordance with the invention.

FIG. 2 shows a repeater in accordance with the invention comprising an inverter 1, an inverter circuit 2, a test circuit 3, a restore and shift circuit 4 and a clock generator circuit 5.

The inverter 1 receives the clock and synchronization signal HM and delivers a signal HMO to the inverter circuit 2 and to the test circuit 3.

The test circuit 3 comprises a first delay line 10, a type D flip-flop 11 and a second delay line 12. The input of the first delay line 10 is connected to the output of the inverter 1 and the output of the first delay line 10 is connected to the clock input of the flip-flop 11, to which it delivers a signal HR which corresponds to the signal HMO delayed by an amount between one half-period and one period of the clock signal of the clock and synchronization signal HMO; the data input D of the flip-flop is connected to the output of the inverter 1, the direct output of the flip-flop delivers a pulse VCF and is connected to the inverter circuit 2 and to the restore and shift circuit 4, and the complemented output of the flip-flop is connected to its reset input through the second delay line 12.

The restore and shift circut 4 comprises two type D flip-flops 13 and 14; the first flip-flop 13 has its clock input connected to the output of the inverter circuit 2, a data input D connected to the direct output of the flip-flop 11 and a direct output connected to a data input D of the second flip-flop 14; the second flip-flop 14 has a clock input connected to the output of the inverter circuit 2 and a complemented output connected to the clock generator circuit 5.

The inverter circuit 2 comprises an exclusive-OR gate having a first input connected to the output of the inverter 1, a second input connected to the direct output of the flip-flop 11 and an output connected on the one hand to the clock inputs of the flip-flops 13 and 14 and on the other hand to the clock generator circuit 5; the exclusive-OR gate delivers a signal CK.

The clock generator circuit 5 comprises a type D flip-flop 20, a delay line 21, a NAND gate 22 and an inverter 23. The flip-flop 20 has a clock input connected to the output of the exclusive-OR gate of the inverter circuit 2, a data input D connected to the complemented output of the flip-flop 14 and a direct output connected on the one hand to the inverter 23 and on the other hand to an input of the NAND gate 22 through the delay line 21. The NAND gate 22 has another input connectd to the complemented output of the flip-flop 14 and an output connected to a reset input of the flip-flop 20. The flip-flop 20 delivers a regenerated clock and synchronization signal HMRO and the inverter delivers the clock and synchronization signal HMR to the input of another clock repeater of a group of repeaters or to the input of the receiver R connected to the group if the repeater is the last of the group.

FIG. 3 is a timing diagram for various signals from FIG. 2.

The clock repeater shown in FIG. 2 operates as follows. The inverter 1 which receives the clock and synchronization signal HM delivers the signal HMO to the first delay line 10 and to the flip-flop 11. By way of example it will be assumed that the clock signal of the clock and synchronization signal HM has a frequency of 8 MHz (so that its period is 125 nanoseconds) and that the synchronization signal of the signal HM has a period of 250 nanoseconds, the synchronization signal being comprised between the edges f1 and f2 of the signal HM shown in FIG. 3, the positive edge f corresponding to the change from the negative pulse to the positive pulse of the synchronization signal.

The first delay line 10 delivers a delayed clock signal HR delayed by approximately 80 nanoseconds relative to the signal HMO; the signal HR makes it possible to recognize the synchronization signal of the signal HMO; the flop-flop 11 delivers a pulse VCF the width of which is fixed by the second delay line 12 at a value of 50 nanoseconds, for example. This pulse VCF appears when the synchronization signal included in the clock and synchronization signal HM, and thus in signal HMO, is recognized by the delayed clock signal HR. Thus the test circuit tests the duration of pulses constituting the signal HMO and delivers a pulse VCF when the duration of a pulse of the signal HMO is greater than the time-delay of the first delay line, that is to say when the signal HMO includes the synchronization signal; thus the role of the test circuit is to detect the synchronization signal by testing the duration of the pulses of the signal HMO and to deliver the pulse VCF as a response to such detection.

The pulse VCF is applied to the inverter circuit 2, that is to say to one input of the exclusive-OR gate constituting this circuit, and produces in the signal CK delivered by said exclusive-OR gate a pulse when the signal HMO assumes the value 0, which corresponds to the edge f of the synchronization signal in the signal HMO. The edge of this pulse in the signal CK is a positive edge corresponding to a negative edge f in the signal HMO; thus the inverter circuit 2 inverts the edge f of the signal HMO. This pulse in the signal CK enables the flip-flop 13 to recognize the pulse VCF so that said flip-flop 13 can deliver a pulse CFM the duration of which is equal to that of the negative pulse (edges f and f2) of the synchronization signal of the signal HMO. The flip-flop 14 which receives on its clock input the signal CK delivers when there is no pulse CFM on its input a signal C of value 1 on its complemented output; when the pulse CFM is applied to the input of the flip-flop 14 the latter delivers on its complemented output a negative pulse in the signal C, shifted relative to the pulse CFM by one period of the signal CK; the duration of the negative pulse of the signal C is equal to one period of the signal CK and thus to the duration of one pulse of the synchronization signal, that is 125 nanoseconds in the example chosen.

The flip-flop 20 of the clock generator circuit 5 which receives the signal C from the flip-flop 14 delivers the signal HMRO; when the signal C has the value 1 the flip-flop 20, driven by the signal CK, delivers on its direct output a signal of value 1 which resets the flip-flop to 0 through the intermediary of the delay line 21 and the NAND gate 22 (signal RZ), the delay line introducing a time-delay of 60 nanoseconds; there is therefore found at the output of the flop-flop 20 a clock signal with the same period as the signal CK, the positive edges of the signal HMRO coinciding in time with those of the signal CK. When the signal C has the value 0, which corresponds to the negative pulse mentioned hereinabove, the signal HMRO at the output of the flip-flop 20 includes a positive pulse the duration of which is equal to one period of the signal CK; when the signal C assumes the value 1 again, the signal HMRO includes a negative pulse having a duration equal to one period of the signal CK, which is 125 nanoseconds, the positive pulse being comprised between the edges f1 and f and the negative pulse being comprised between the edges f and f2 of the signal HMRO. There is thus found in the signal HMRO the synchronization signal incorporated in the clock and synchronization signal HM applied to the repeater input; at the output of the inverter 23 the repeater delivers the clock and synchronization signal HMR identical to the clock and synchronization signal HM except that in it the synchronization signal is shifted by two periods of the clock signal, that is 2×125=250 nanoseconds.

When the repeater is the first repeater RP1 of a group, the clock and synchronization signal HM that it receives is that delivered by a slave clock. As previously indicated, in the signal HM the positive edge f corresponds to inversion of the edge of the clock signal and this inversion introduces an error of approximately 1.5 nanoseconds; allowing for a supplementary error of 0.5 nanoseconds introduced by the slave clock/repeater connection, then the error $\epsilon e$ at the repeater input is $\epsilon e = 2$ nanoseconds.

In the repeater the inverter 1 introduces an error of 1 ns in respect of the edge f of the signal HMO and the inverter circuit 2 (exclusive-OR gate) introduces an error of 1 ns in respect of the edge of the signal CK corresponding to the edge f of the signal HMO. In the clock and synchronization signal HMR delivered by the repeater these errors result in error $\epsilon 1 = \epsilon e + 2 = 4$ nanoseconds on the edge A of the clock signal, the two clock periods preceding the synchronization signal each having a duration equal to $125 \pm 1$ nanoseconds, the combination of these two periods having a duration of 250 ns. In the repeater the flip-flop 20 introduces an error in respect of the edge f of the signal HMRO of 0.5 ns and the inverter 23 adds to the corresponding edge f in the signal HMR an error of 1 ns; allowing for an additional error of 0.5 ns introduced by the connection between the repeater RP1 nd another repeater or a receiver, the error in respect of the edge f in the signal received by the repeater or the receiver is $\epsilon 2 = 2$ nanoseconds. Each pulse of the synchronization signal has a duration of $125 \pm 2$ nanoseconds, the duration of the synchronization signal being 250 nanoseconds.

When a repeater receives a clock and synchronization signal from another repeater it introduces errors $\epsilon 1$ and $\epsilon 2$, but allowing for the fact that between the input and the output of a repeater the synchronization signal is shifted by two periods of the clock signal, these errors are not cumulative with those introduced by the preceding repeater. Thus when a group of repeaters comprises n repeaters, the clock and synchronization signal HMR delivered by the last repeater RPn of the group comprises 2n periods of the clock signal featuring an error $\epsilon 1$ in respect of the cyclic ratio, the synchronization signal featuring an error $\epsilon 2$ and being shifted by 2n clock periods relative to the synchronization signal HM at the input of the group.

In the case of distribution of a triplicated clock, and returning to the example already given, the clock signal in the clock and synchronization signal HM (or HMR at the output of a repeater) has a frequency of 8 MHz and a receiver R delivers a clock signal H at 4 MHz, obtained by dividing by two the 8 MHz signal; this 4 MHz clock signal H then comprises n+1 periods each featuring an error with regard to the cyclic ratio of:

$$4 \text{ ns}/125 \text{ ns} = 3.2\%$$

Thus in the case of a group of n repeaters, the disturbance to the clock signal H delivered by a repeater, associated with the synchronization signal, is not increased by a factor of n; the disturbances are distributed in time over n+1 periods and the maximum degradation of the cyclic ratio remains within the known limits; only the frequency with which these disturbances appear is muliplied by a factor of n+1. Given the low value of the error in respect of the cyclic ratio, these disturbances of the clock signal H are not a problem for the user circuits.

The disturbances introduced by the n repeaters of a group of repeaters being distributed over 2n periods of the clock signal of a clock and synchronization signal (HMR1, for example, FIG. 1) delivered to a receiver R and the synchronization signal being shifted by 2n clock periods relative to the synchronization signal in the signal H1 at the input of the group of repeaters, it is imperative that each group of repeaters in a triplicated clock distribution device comprises the same number n of repeaters so that the synchronization signals of the signals HMR1, HMR2 and HMR3 are in phase, the receiver R having a majority decision logic circuit at its input.

When in a telecommunications switching center the user circuits constitute groups each fed by one receiver, it is also imperative that all the groups of repeaters connecting the receivers to the slave clocks comprise the same number of repeaters. FIG. 4 illustrates the situation. Each group of user circuits UT1, UT2, UT3 is connected to a receiver R1, R2, R3 which supplies to it a clock signal H and a synchronization signal HS. Each receiver is connected to the slave clocks OE1, OE2, OE3 by a set of repeaters ER consisting of three group of repeaters GR1, GR2, GR3 each comprising n repeaters RP1 through RPn. In this way the clock signal H and synchronization signal HS delivered by the receivers R1, R2, R3 to the user circuits are in phase, an essential precondition for correct operation of the telecommunications switching center.

There is claimed:

1. Repeater for connecting to a receiver a clock producing a clock and synchronization signal consisting of a clock signal and a synchronization signal that comprises one positive pulse and one negative pulse, each pulse having a duration equal to one period of said clock signal, said repeater comprising an inverter adapted to invert an incoming clock and synchronization signal, an inverter circuit having a first input connected to said inverter, a test circuit, a restore and shift circuit and a clock generator circuit, in which repeater, an input of said test circuit is connected to said inverter, an output of said test circuit is connected further to a second input of said inverter circuit and secondly to said restore and shift circuit, said test circuit is adapted to test the duration to signal pulses from said inverter in order to detect said synchronization signal and to generate a pulse in respoonse to such detection of said synchronization signal, said restore and shift circuit has a first input connected to said test circuit, second and third inputs connected to an output of said inverter circuit and an output connected to said clock generator circuit, said restore and shift circuit is adapted to generate a pulse the duration of which is equal to that of one pulse of said synchronization signal and which is shifted by two periods of said clock signal relative to said negative pulse of said synchronization signal, and said clock generator circuit has its input connected to the output of said restore and shift circuit and to said inverter circuit and is adapted to produce at its output a clock and synchronization signal.

2. Repeater according to claim 1, wherein said test circuit comprises a first delay line, a type D flip-flop and a second delay line, an input of said first delay line and a data input of said flip-flop are connected to the output of said inverter, a clock input of said flip-flop is connected to the output of said first delay line, a direct output of said flip-flop is connected to said inverter circuit and to said restore and shift circuit and a complemented output of said flip-flop is connected via said second delay line to a reset input of said flip-flop.

3. Repeater according to claim 1, wherein said inverter circuit comprises an exclusive-OR gate having a first input connected to the output of said inverter, a second input connected to the output of said test circuit and an output connected to said second and third inputs of said restore and shift circuit and said inverter circuit is adapted to produce a signal in which a positive-going pulse in said clock and synchronization signal produced by said inverter corresponds to a negative-going pulse between said two pulses of said synchronization signal.

4. Repeater according to claim 1, wherein said restore and shift circuit comprises first and second type D flip-flops the first of which has a data input connected to the output of said test circuit, a clock input connected to the output of said inverter circuit and an output connected to a data input of said second type D flip-flop which has a clock input connected to the output of said inverter circuit and a complemented output connected to said clock generator circuit, said clock inputs of said first and second type D flip-flops constituting said first and second inputs of said restore and shift circuit.

5. Repeater according to claim 1, wherein said clock generator circuit comprises a type D flip-flop, a delay line, a NAND gate and an inverter, said flip-flop has a data input connected to the output of said restore and shift circuit, a clock input connected to the output of said inverter circuit and a direct output connected to said inverter which delivers a clock and synchronization signal, and said NAND gate has one input connected to the output of said restore and shift circuit, another input connected by said delay line to said direct output of said flip-flop and an output connected to a reset input of said flip-flop.

* * * * *